United States Patent [19]
Stauffer

[11] 3,930,261
[45] Dec. 30, 1975

[54] AUTOMATIC FOCUS APPARATUS

[75] Inventor: Norman L. Stauffer, Englewood, Colo.

[73] Assignee: Honeywell Inc., Minneapolis, Minn.

[22] Filed: Aug. 27, 1974

[21] Appl. No.: 500,868

[52] U.S. Cl. ................................. 354/25; 355/56
[51] Int. Cl.² .......................................... G03B 7/08
[58] Field of Search ....................... 354/25; 355/56

[56] References Cited
UNITED STATES PATENTS
3,450,018   6/1969   John .................................. 354/25

Primary Examiner—Monroe H. Hayes
Attorney, Agent, or Firm—Arthur H. Swanson; Lockwood D. Burton; George E. Bodenstein

[57] ABSTRACT

A focus control system for a still camera includes a photoelectric amplifier and a high frequency spatial filter. The filter is arranged to scan the image region of a fixed focus lens as the taking lens of the camera is moved from an extended position toward the infinity position thereof. During a first portion of the scanning movement the filter provides an initial signal representative of the brightness of the imaging light bundles for automatic gain control. The gain of a photosensitive detector is initially set during this period. During a second portion of the scanning movement, the filter moves through the image space and continues to provide a signal for adjusting the gain of the detector. This signal has a maximum amplitude as the filter passes through the actual image. A change of slope detector senses this position and actuates a mechanical stop to freeze the position of the taking lens at that position. It is contemplated that the shutter of the camera would then be released to initiate the exposure.

8 Claims, 6 Drawing Figures

AUTOMATIC FOCUS APPARATUS

BACKGROUND OF THE INVENTION

1. Field of the invention

This invention relates to improvements in optical apparatus for achieving automatic focus, particularly in small, still cameras.

2. Description of the prior art

Heretofore many structures have been proposed for detecting the focus of an optical system and for controlling the focus. One such structure includes a spatial frequency filter which derives a spatial frequency spectrum from the light output of a lens system. Superimposed upon this spectrum is an amplitude modulation corresponding to a scanning of the focus. By this means a fluctuating light flux pattern is produced containing information concerning the focus. Focus information extracted from such pattern is employed to bring the image of a subject being photographed into a position of desired focus on the film of the camera.

The spatial frequency filters of the prior art have comprised bulky and complicated rotating disc or drum structures. Such discs or drums have regularly spaced alternate transparent and opaque portions. As a result, such discs or drums uniformally chop or intercept, in the vicinity of the desired image plane, the imaging light bundles or components of the light beam that make up the image. When such a uniformally operable chopper or interceptor is used for the spatial frequency filter, it has been found that undesired changes in detected signal amplitude can occur. Such changes give rise to spurious modulation and result in error in the focus determination. This undesired action is believed to be due to signals that are produced by two, or several, subjects of nearly equal contrast, the images of which are so positioned on the chopper that they produce out of phase signals for the chopper positions where otherwise large amplitude signals would be expected.

SUMMARY OF THE INVENTION

An object of the present invention is to provide an improved optical focus detecting structure having particular utility in small still cameras and which is not subject to the foregoing disadvantages of the prior art structures.

Another object of the invention is to provide an optical focus detecting structure including a spatial frequency filter comprising a light beam interceptor having alternate transparent and opaque sectors randomly disposed thereon and so arranged that the interceptions of the light beam components in the vicinity of the desired image plane are effected in a non-uniform and random manner in a single scanning sweep of said filter with average distribution of transmitted light through said filter remaining substantially at fifty percent.

A further object of the invention is to provide such an improved spatial filtering apparatus comprising a chopper or interceptor having a plurality of alternately transparent and opaque sector pairs, the widths of both sectors of a pair being the same and randomly different from the widths of the sectors of adjacent pairs, and wherein the desired focus detecting operation is achieved in a single focus scanning sweep of said chopper.

A further object of the invention is to provide in association with such an improved spatial filtering apparatus and a photosensitive detector, means to provide an initial signal representative of the brightness of the imaging light bundles for automatic gain control adjustment of said detector, during an initial period of the focus scanning sweep of said filter.

A further object of said invention is to provide in combination with such an optical focus detecting structure means to cause a focal adjustment of the taking lens of a camera coincident with and proportional in magnitude to the extent of the scanning sweep of said filter.

In accomplishing these and other objects, there has been provided, in accordance with the present invention, an improved automatic focus detecting and taking lens adjusting structure having a novel focus scanning and spatial frequency filter. In the operation of the apparatus, the taking lens of a camera is released to move in a region from an extended position toward its infinity position. Simultaneously with the motion of the taking lens, a light beam interceptor or chopper is moved in the image region of a fixed focus lens. The chopper has a first portion located near the nominal image focus position of a subject to be photographed. The function of said first portion is to provide an initial signal representative of imaging light bundle brightness for automatic gain control operation of an electrical responsive means that is employed to effect needed corrections or adjustments of the subject image focus position. The gain of the electrical signal responsive means is set during this period. Also, movement of the chopper through this initial portion allows the chopper to get up to initial operational speed. Total travel time for the chopper during its scanning operation is very short, for example, 100 milliseconds. During the latter portion of said travel, a ramp portion of the chopper moves through and scans the image space in the vicinity of the actual image, commencing at a position at one side of the actual image and proceeding toward said actual image. The light transmitted by the chopper is arranged to impinge upon a photoelectric sensor. This provides a signal for further adjustment of the gain of the electrical responsive means. When the chopper scanning position coincides with the actual image, a maximum amplitude signal is produced by the photocell. This maximum amplitude signal is detected, that is the peak signal is used as an indication of the actual image position. In a preferred embodiment of the invention, a change of slope detector is provided to indicate this position and to actuate a mechanical stop or brake to freeze the position of the taking lens at this position. Also, in accordance with the invention, it is contemplated that the shutter of the camera would then be released to initiate the exposure of the camera film to the subject being photographed.

BRIEF DESCRIPTION OF THE DRAWINGS

A better understanding of the present invention may be had from the following detailed description when read in connection with the accompanying drawings, wherein.

DETAILED DESCRIPTION OF THE PREFERRED EMBODIMENT

Figure 1:
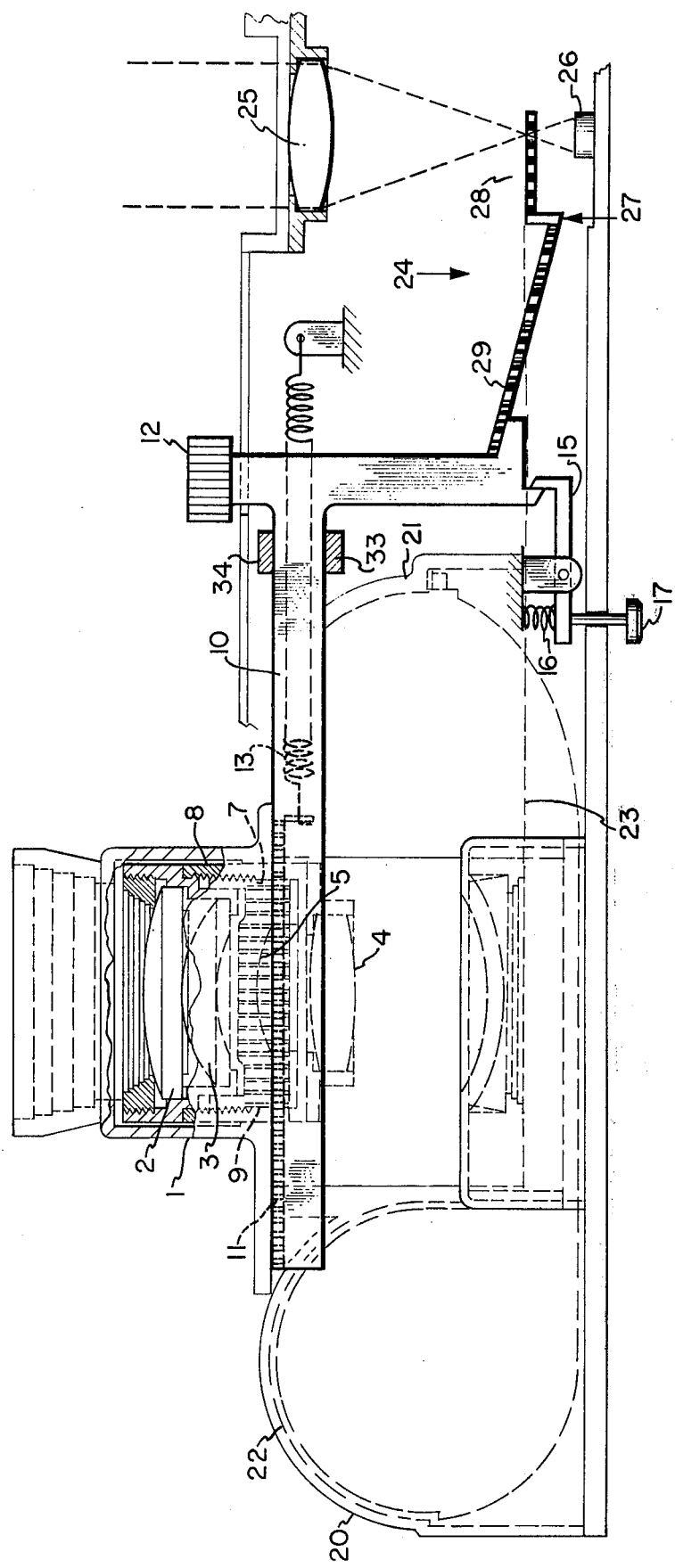
FIG. 1 is a diagrammatical representation of an optical focus control structure according to the present invention, as applied to focus the lens of a camera.

The diagrammatic illustration of FIG. 1 of the drawings shows the interrelations of the various structural components of the invention when used in conjunction with a camera. Thus there is shown a schematic representation of a lens barrel indicated by the numeral 1 of a type commonly in use in cameras. Within the lens barrel there is positioned a multi-element lens system. A first element of the lens system indicated at 2 and a second element indicated at 3 are fixed lens element, as is also a third lens element indicated at 4. A fourth lens element indicated at 5 is mounted in a collar 7 which is externally threaded. A sleeve 8 is fixedly mounted within the lens barrel 1 and is internally threaded to engage with the threads provided on the exterior of the collar 7. The lower peripheral surface of the collar 7, as seen in FIG. 1, is provided with a series of longitudinal grooves 9 parallel the axis of the collar and which constitute a gear sector.

A slide plate 10 is arranged to be moved transversely of the axis of the lens barrel 1. At the portion of the slide plate 10 adjacent the lens barrel 1 there is formed a rack of gear teeth 11. This rack is arranged to engage the grooves or gear teeth 9 on the peripheral surface of the collar 7. Thus, as the slide plate 10 is shifted transversely of the lens barrel 1, the engagement of the rack 11 with the gear teeth 9 on the collar 7 causes the collar and the fourth lens element 5 carried thereby to move axially of the lens system and to change the focus adjustment of the lens system.

The slide plate 10 is arranged to be caused to be moved transversely of the lens barrel 1 by engaging a knurled member 12 by a finger of the operator. If desired, structure automatically operable in response to the closure of an electrical switch may be provided to effect the transverse adjustment of the slide plate 10 relatively to the lens barrel. Such means are known in the prior art, and for example, may include a second rack, not shown, carried by the slide plate 10. Such second rack may be engaged and driven by a spur gear, the spur gear, in turn, being driven by an electrical motor. This arrangement may be similar to that disclosed in the copending application of Dean M. Peterson, bearing Ser. No. 453,888, filed Mar. 22, 1974, wherein an electrical motor is used to accomplish a resetting of the shutter mechanism of the camera and the advancement of the film to the next film frame position. It is contemplated that such a shutter adjustment and film advancement mechanism may be embodied in the structure of FIG. 1 of the present invention. Thus, simultaneously with the shutter and film advancement adjustments, the slide plate 10 will be adjusted to the left, as seen in the illustration embodiment, to a cocked position.

When moved to its cocked position either by means of the knurled member 12 or by automatic means as described, the slide plate 10 is restrained against the urging of an elongated spring 13 for movement toward the right by a latch 15. The latch 15 is held in engagement with the slide plate 10 by the force of a compression spring 16. The latch 15 may be released to allow the slide plate 10 to move toward the right transversely of the lens barrel 1 by depressing a pin 17. The pin 17 and the knurled member 12 are arranged for manipulation externally of the housing containing the several structural components of the camera.

Adjacent to the lens barrel 1 and on opposite sides of the forward half, as seen in FIG. 1, there is positioned a first and a second film cartridge receptacle 20 and 21, respectively. An associated film cartridge 22 is shown, in phantom, in position in the receptacles. The multi-element lens system contained within the barrel 1 is operative when properly adjusted to focus incident light on the surface of the fixed lens element 2 on the emulsion of the film in the film cartridge 22. The predetermined plane containing the film emulsion is indicated at 23. While not illustrated in FIG. 1, the camera desirably includes, as previously explained, a suitable exposure control system for selectively exposing the film in the cartridge 22 to light reflected from a subject to be photographed. The exposure control system provided desirably may be of the type disclosed in the aforementioned copending application of Dean Peterson, including a pair of shutter blades arranged for oppositely directed translational movement and having configured openings which may be brought partly or wholly into alignment with each other to admit a predetermined amount of light to the film chamber of the camera. As disclosed in said Peterson application, such automatic exposure control system may be automatically operative in response to the amount of light received in the film chamber to control the extent and the duration of the time the shutter blades admit light from the subject being photographed to the film chamber.

The image in the vicinity of the plane 23 is arranged to be scanned and modulated by an optical focus detector indicated generally by reference numeral 24 to provide a fluctuating light flux pattern. This light flux pattern, as described hereinafter, contains information concerning the position of the image of the subject being photographed relative to the plane 23.

Focus detector 24 includes a fixed focus lens 25. When parallel light rays impinge upon and are transmitted by lens 25, they are brought together or focus, as those skilled in the art understand, at a point behind the lens. This focal distance, termed the focal length of the lens, is determined by the shape of the lens and never changes. This condition obtains when the subject to be photographed is at an "infinite" distance from the lens.

For light rays that impinge upon the lens which are not parallel, the condition when the subject is closer than "infinity" to the lens, the light rays focus at a distance that grows larger the nearer the subject approaches the lens.

The fixed focus lens 25 is so chosen and located that, as the subject distance increases toward infinity, the plane in which the subject image will be produced by the lens will shift from a position below the predetermined plane 23, as seen in FIG. 1, to a position above said predetermined plane.

The focus detector 24 also includes a photoelectric sensor indicated at 26 for deriving an electrical signal from said fluctuating light flux pattern. The fluctuating light flux pattern produced and sensed by the detector 24 shifts in phase and changes in waveshape dependent upon the position of the image as focused by the lens 25 with respect to the predetermined plane 23. Such changes in phase and waveshape produce corresponding changes in the electrical signal produced at the output of photoelectric sensor 26.

Figure 2:
FIG. 2 is a plan view of the spatial frequency filter employed in the structure illustrated in FIG. 1.

Focus detector 24 also includes a spatial filter plate 27, a plan view of which is shown in FIG. 2. The spatial filter plate 27 is positioned in the region of the said predetermined plane 23 and is arranged for reciprocatory movement with the slide plate 10. Thus, when the slide plate 10 is released from its cocked, extreme left hand position as seen in the illustrative embodiment, the spatial filter plate 27 moves toward the right with plate 10, to scan the light rays comprising the image produced in the region of the said predetermined plane 23 by the light incident on the lens 25.

Figure 3:
FIG. 3 is a plan view of an alternative form of spatial filter that may be employed in the structure of FIG. 1.

The spatial filter plate 27, as illustrated in FIG. 2 has a first, low frequency, portion 28 that is located in or near the said predetermined plane 23 and is arranged for movement parallel to said plane. Alternatively, this first portion of the spatial filter plate may comprise an inclined or linear ramp as indicated in the spatial filter plate configuration shown in FIG. 3. The function of the first portion of the spatial filter 27 is to provide an initial low frequency signal for establishing an initial level for an automatic gain control means for electrical signal responsive means that may be employed with the structure of FIG. 1, to respond to the electrical signals produced by the photoelectric sensor 26. The initial gain of the electrical signal responsive means is set during this period. As described hereinafter, the electrical signal responsive means are arranged to control the focus adjustment of the camera.

During the time that the first portion of the spatial filter plate 27 is traversing the light rays making up the image, the spatial filter plate 27 is allowed to get up to initial operational speed by virtue of the driving action of the spring 13. The total travel time of the spatial filter plate 27 through the image region may take about 100 milliseconds.

During the final part of the travel of the spatial filter plate 27 toward the right, the ramp portion 29 of the plate 27 moves through the image space. The function of this second portion of the spatial filter plate 27 is to provide a light pattern having high frequency fluctuating components to provide a high frequency signal for controlling the focusing operation of the camera. This high frequency signal also is utilized to control the gain of the automatic gain control means.

By reference to FIG. 2, it will be seen that the first portion 28 of the spatial filter plate 27 comprises an interceptor consisting of regularly spaced parallel opaque bars disposed alternately with parallel transparent bars of the same width. The second portion 29 of the spatial filter 27 consists of irregularly spaced parallel opaque bars disposed alternately with transparent bars. The portion 29, however, is oriented at an angle relatively to the image in the region of the predetermined plane 23, coinciding at a central portion thereof with the actual image of the subject being photographed. As indicated in the drawing, the bars of portion 29 are much more closely spaced than those of portion 28. Additionally, the opaque and transparent bars of the portion 29 are arranged in pairs. The widths of the opaque and transparent bars of each pair are substantially the same, but the widths of adjacent pairs of opaque and transparent bars are so selected as to be randomly different. With this arrangement there is an average transmission of light through the spatial filter 27 of 50 percent throughout the range of movement of the latter.

In the process of operating the camera, when the latch 15 is released, for example, by the actuation of the pin 17, the slide plate 10 moves, under the urging of the spring 13, toward the right. As the first portion 28 moves through the image region, the said portion 28 operates to provide regularly occurring low frequency interruptions in the light directed to the photoelectric sensor 26 by the lens 25. This produces a low frequency electrical signal at the output of the photoelectric sensor 26 of a magnitude that will vary in accordance with the intensity or brightness of the ambient light incident from the subject being photographed on the lens 25.

As the spatial frequency filter plate 27 continues to move toward the right, the light ray components of the image are examined by the portion 29 thereof from a position below the predetermined plane 23, as seen in FIG. 1 until in an intermediate position of this focus scanning operation, the plane examined coincides with the actual image of the subject being photographed that is produced by the lens 25. That is to say, in such intermediate position the spatial frequency filter portion 29 intercepts the said actual image. Upon such occurrence a maximum amplitude signal is produced by the photoelectric sensor 26. This signal, as previously indicated, is higher in frequency than that produced by the portion 28 of the spatial filter plate 27.

Figure 4:
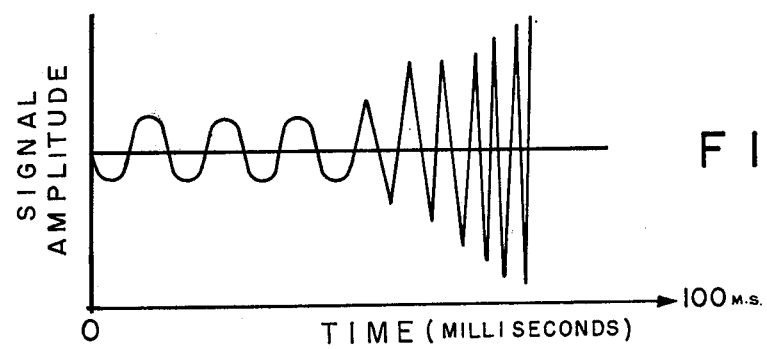
FIG. 4 is a wave form diagram illustrating the operation of the spatial frequency filter of FIG. 1.

A typical form of the light flux pattern that is produced upon such scanning operation of the spatial filter plate 27 is illustrated in FIG. 4. The maximum peak of this light flux pattern occurs when the spatial filter plate portion 29 moves through the actual image produced by the fixed focus lens 25. Accordingly, as the said actual image shifts toward or away from lens 25, the peak of the fluctuating wave pattern illustrated in FIG. 4 will shift to the right or left of the position illustrated. In accordance with the invention, the position of this peak in the scanning movement of the spatial filter 27 from left to right, as seen in FIG. 1, is utilized to actuate a mechanical stop brake to freeze the position of the slide plate 10 and thereby the then position of the movable lens member 5 of the lens barrel 1. The movable lens member 5 is then at the optimal focus position for the subject being photographed. It is contemplated that the shutter of the camera would then be released to initiate the exposure.

Figure 5:
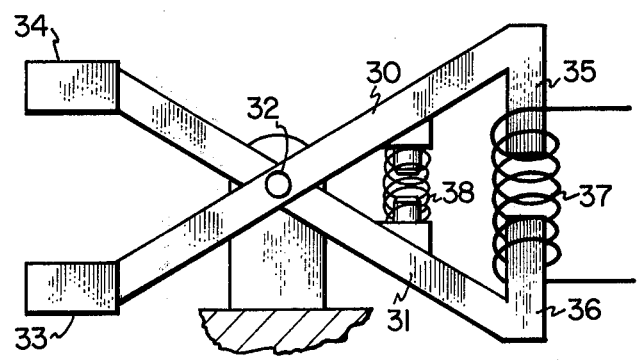
FIG. 5 illustrates a form of brake mechanism that may be employed in the apparatus of FIG. 1.

Any suitable mechanical stop or brake member may be employed in accordance with the present invention to thus freeze the position of the taking lens 5 of the camera at the optimal focus position. The form of such brake member illustrated in FIGS. 1 and 5 comprise a scissors arrangement comprising crossbar members 30 and 31 that are suitably pivoted to each other and to the frame of the camera at 32. Brake shoes 33 and 34 are carried at adjacent ends of the members 30 and 31. Magnetic members 35 and 36 are carried at the opposite ends of said members 30 and 31, respectively. The magnetic members 35 and 36 are disposed within an electromagnetic coil indicated at 37. The electromagnetic coil 37, in accordance with the present invention, is arranged to be energized by the aforementioned electrical signal responsive means.

Figure 6:
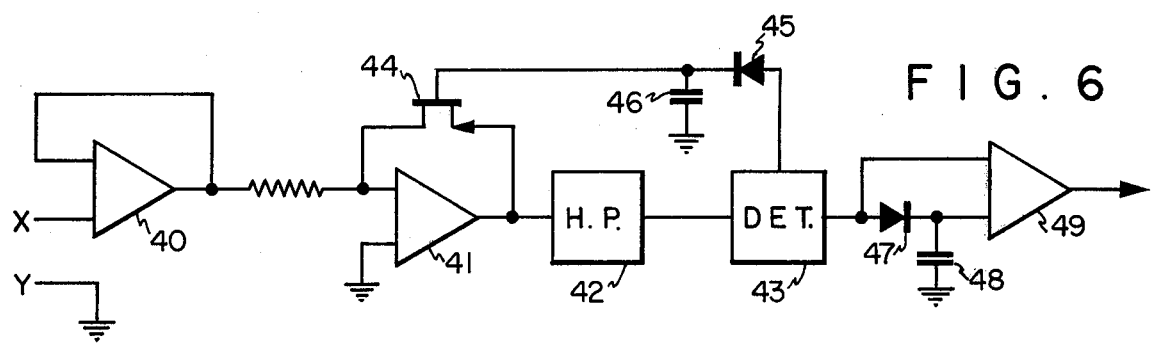
FIG. 6 is a schematic diagram of a preferred embodiment of an electrical signal responsive means that may be employed with the apparatus illustrated in FIG. 1.

Various forms of electrical signal responsive means may be employed for this purpose, as those skilled in the art will understand. The form of electrical signal responsive means that is shown in the schematic diagram of FIG. 6 comprises a voltage follower pre-amplifier shown at 40 to provide a high input impedance. The output terminals of the photoelectric sensor 26 are connected to the input terminal of the amplifier 40. By providing a pre-amplifier having a high input impedance, the focus detector 24 is allowed to operate in a region where logarithmic response is exhibited. This makes the output signal from the amplifier 40 less sensitive to brightness level of the image in the region being examined by the spatial frequency filter. The signal output from the pre-amplifier 40 is amplified by an amplifier 41. The amplified signal at the output of the amplifier 41 is filtered by a high pass filter 42. The high pass filter 42 removes alternating current components which may be caused by motion, alternating current lighting or other alternating current components lower in frequency than those derived from portion 28 of the spatial filter plate 27. Typically, the filter 42 is arranged to pass from 3 kilohertz up.

The signal output from the high pass filter 42 is detected by a detector indicated at 43. The output of the detector is connected to the gate electrode of an automatic gain control unit comprising a field effect transistor indicated at 44 and having its drain and source electrodes connected, respectively, to the input and the output circuits of the amplifier 41. A diode 45 and a capacitor 46 are included in the connection from the output of detector 43 to the gate electrode of unit 44.

In the operation of the apparatus, the initial movement of the spatial filter plate 27 through its first portion 28 is effective to provide a low frequency signal which after rectification by the detector 43, is used for controlling the initial setting of the automatic gain control unit 44 as required to provide proper response of the electrical signal responsive means for the existing brightness level of the light incident on the taking lens of the camera from the subject being photographed. Subsequent movement of the spatial filter plate through its second portion 29 is effective to provide a high frequency signal which, again upon rectification by the detector 43, is used to vary the effect of the automatic gain control unit 44 in accordance with changes in said brightness level.

The detected and filtered signal from detector 43 is also applied to a circuit including a diode 47 and a capacitor 48. The voltage developed across the diode 47 is applied to an amplifier 49. The output terminals of the amplifier 49 are connected to the electromagnetic coil 37.

The detector 43 and the diode 47 and capacitor 48 serve effectively as a change of slope detector to provide a signal at the output of the amplifier 49 at the instant that the output signal produced by the photoelectric sensor 26 has reached its peak amplitude. The resultant energization of the electromagnetic coil 37 is operative to urge the scissors members 30 and 31 together to press the brake shoes 33 and 34 into engagement with the slide plate 10, thereby quickly to stop the movement of the latter and to stop the lens 5 in its then position of adjustment.

In accordance with the invention, it is contemplated that the actuation of the pin 17 to release the slide plate 10 for movement to the right and the consequent focus scanning will immediately be followed by actuation of the shutter mechanism of the camera to effect an exposure to the taking lens 5 of the camera of the film in the cartridge to the subject being photographed.

Thus there has been provided in accordance with the present invention an improved automatic focus detecting and adjusting structure in which simultaneously with focusing motion of the taking lens a spatial light filter scans the image region of a subject being photographed. The spatial light filter is characterized in its randomness of light interception thereby avoiding errors tending to result from spurious modulation in the focus determination. The focus scanning and spatial frequency filter further is characterized in requiring but a single scanning movement in effecting the focus determination, and uniquely provides a signal representative of brightness of the incident radiation from the subject being photographed for effecting a desirable automatic gain control function. When, in a scanning operation, the spatial frequency filter passes through the actual image, a maximum amplitude signal is produced. That signal is detected and the peak signal is used as an indication of the subject image focus position. A change of slope detector is provided to indicate this position and to actuate a brake to freeze the position of the taking lens of a camera at this position. The shutter of the camera is then released to initiate the exposure of the camera film to the subject being photographed.

The embodiments of the invention in which an exclusive property or privilege is claimed are defined as follows:

1. Optical focusing structure for a camera including a taking lens, said taking lens being adjustable through a range of positions from substantially an extended position to substantially an infinity position, a spatial frequency filter, a fixed focus lens, said fixed focus lens providing imaging light ray components in the region of said filter from a subject to be photographed, means coupled to said taking lens and to said filter and operable on command to move said taking lens progressively between the last-mentioned two positions and simultaneously to move said filter in a first direction through said components to chop the latter, and in a second direction along said components to scan for the position of the subject image produced by said components, light sensitive detector means positioned to receive said components and to produce a detector signal of a frequency dependent upon the rate at which said filter chops said components, and of a value which reaches a maximum when said motion of said filter in said second direction causes said filter to intercept said image, peak detecting means connected to said detector means and responsive to the value of said detector signal to produce a stop signal when said value reaches said maximum, and means connected to said peak detecting means and responsive to said stop signal to stop the adjustment of said taking lens at its then position of adjustment upon the receipt of said stop signal, the last-mentioned position of said taking lens causing the latter to focus an image of said subject on a film plane of the camera.

2. Optical focusing structure as set forth in claim 1, wherein said light sensitive detector means includes gain controlling means which determines the gain of said detector means under the control of said detector signal, and wherein said filter includes a portion which is operative during the initial movement of said filter in said first direction to make said detector signal so vary that said gain controlling means sets the gain of said detector means in accordance with the brightness level of said components emerging from said fixed focus lens.

3. Optical focusing structure as set forth in claim 2, wherein said portion of said filter causes said detector signal to vary at a relatively low frequency during said initial movement of said filter, and wherein the remainder of said filter, during the remainder of said movement of said filter in said first direction, causes said detector signal to vary at a relatively high frequency and said gain controlling means to vary the gain of said detector means in accordance with changes in said brightness level.

4. Optical focusing structure as set forth in claim 3, wherein said remainder of said filter comprises alternate transparent and opaque bars arranged in pairs, with the bars of any pair being of equal width and the widths of adjacent pairs being selected to be randomly different from each other, and wherein said bars extend transversely of said first and second directions.

5. Optical focusing structure as set forth in claim 1, wherein said filter comprises alternate transparent and opaque bars arranged in pairs, with the bars of any pair being of equal width and the widths of adjacent pairs being selected to be randomly different from each other, and wherein said bars extend transversely of said first and second directions.

6. Optical focusing structure as set forth in claim 5, wherein said light sensitive detector means includes gain controlling means which determines the gain of said detector means under the control of said detector signal, and wherein said filter includes a portion which is operative during the initial movement of said filter in said first direction to make said detector signal so vary that said gain controlling means sets the gain of said detector means in accordance with the brightness level of said components emerging from said fixed focus lens.

7. Optical focusing structure as set forth in claim 6, wherein said movement of said filter in said second direction is delayed until after said initial movement in said first direction.

8. Optical focusing structure as set forth in claim 6, wherein said filter moves in said second direction at all times that is is moving in said first direction.

* * * * *